United States Patent [19]
Davila, Jr. et al.

[11] Patent Number: 6,163,466
[45] Date of Patent: Dec. 19, 2000

[54] ASYMMETRICAL DC/DC CONVERTER HAVING OUTPUT CURRENT DOUBLER

[75] Inventors: Marco A. Davila, Jr., Mesquite; Yimin Jiang; Rui Liu, both of Plano, all of Tex.

[73] Assignee: Lucent Technologies, Inc., Murray Hill, N.J.

[21] Appl. No.: 09/397,991

[22] Filed: Sep. 16, 1999

[51] Int. Cl.$^7$ .................................................. H02M 3/335

[52] U.S. Cl. .............................................. 363/17; 363/47

[58] Field of Search ................................. 363/17, 53, 47, 363/98, 45

[56] References Cited

U.S. PATENT DOCUMENTS

| | | | |
|---|---|---|---|
| 5,870,291 | 2/1999 | Farrington et al. | 363/17 |
| 5,986,904 | 11/1999 | Jacobs et al. | 363/53 |

*Primary Examiner*—Shawn Riley

[57] ABSTRACT

A circuit for, and method of, reducing a preload current required to maintain a duty cycle of an asymmetrical DC/DC converter and a DC/DC converter incorporating the circuit or the method. In one embodiment, the circuit includes an auxiliary inductor, coupled in series with an output capacitor of the converter in an output current doubler thereof, that reduces ripple current in the output current doubler and thereby maintains the duty cycle.

21 Claims, 2 Drawing Sheets

6,163,466

ASYMMETRICAL DC/DC CONVERTER HAVING OUTPUT CURRENT DOUBLER

TECHNICAL FIELD OF THE INVENTION

The present invention is directed, in general, to power converters and, more specifically, to an asymmetrical DC/DC converter having an improved output current doubler and method of operation thereof.

BACKGROUND OF THE INVENTION

A power converter is a power processing circuit that converts an input voltage waveform into a specified output voltage waveform. In many applications requiring a stable and well-regulated output, switched-mode power converters are frequently employed to advantage. Switched-mode power converters generally include an inverter, a transformer having a primary winding coupled to the inverter, an output rectifier coupled to a secondary winding of the transformer, an output filter and a controller. The inverter generally includes a power switch, such as a field-effect transistor (FET), that converts an input voltage to a switched voltage that is applied across the transformer. The transformer may transform the voltage to another value and the output circuit generates a desired voltage at the output of the converter. The output filter typically includes an inductor and an output capacitor. The output capacitor smooths and filters the output voltage for delivery to a load.

There are two common methods of regulating the output voltage of the converter, namely, voltage-mode control and current-mode control. In voltage-mode control, the controller typically includes an error amplifier coupled to the output of the power converter. The controller further includes a modulator coupled between the error amplifier and the power switch. The error amplifier monitors the output voltage of the power converter and generates an error signal representing a deviation between the actual output voltage and a desired output voltage. The modulator then generates a drive signal for the power switch based on the error signal. For example, the drive signal may maintain the power switch in a conduction mode while the error signal exceeds an internal timing signal. The drive signal may then transition the power switch to a non-conduction mode when the periodic timing signal reaches the error signal.

In current-mode control, a current in the power converter, such as a switch current through the power switch or an inductor current through the output inductor, is substituted for, or added to, the periodic ramp signal. The output voltage of the converter is still fed back through the error amplifier circuit to provide a component of the error signal for the modulator. The aforementioned methods and variations thereof are widely used and are adequate for many loads.

In conventional voltage or current mode control, the switching cycle may be divided into a primary interval D (during which the power switch is in the conduction mode) and an auxiliary interval 1−D (during which the power switch is in the non-conduction mode). The modulator determines when the power switch will be conducting or non-conducting in concert with the internal timing signal and the error signal derived from the voltage or current being monitored. The modulator thus exhibits an active decision process during the primary interval D. Any change in the error signal either continues to keep the power switch in the conduction mode or places the power switch in the non-conduction mode, thereby ending the primary interval D. During the auxiliary interval 1−D, however, the modulator typically waits for the timing circuit to begin a new switching cycle.

A converter employing an output circuit organized as a current doubler is of particular interest. The output current doubler circuit uses two inductors that are arranged to deliver current in a balanced fashion to an output load. The output current is the sum of the two inductor currents. Under ideal conditions, the ratio of the inductances of the two inductors would be selected to equal D/(1−D), which would provide zero ripple current for almost all values of load current. Practically, the inductances vary over a range, depending on acceptable design tolerances. Therefore, the two inductor ripple currents are typically different in value.

For larger values of load current, this difference in inductor ripple currents causes no appreciable problem. However, for a load current that is near zero, the imbalance in inductor currents induces a current into the output capacitor often causing the modulator to greatly reduce its duty cycle thereby increasing losses in the converter. This behavior is conventionally avoided by "preloading" the output. Preloading is accomplished by applying a minimum load to the converter's output thereby forcing the converter to deliver a minimum amount of load current. The preload current must be sufficient to accommodate the imbalance in the inductor ripple currents. Unfortunately, the preload current reduces the overall efficiency of the converter and generates additional heat.

Accordingly, what is needed in the art is an effective way to minimize the value of preload current for a converter employing an output current doubler circuit.

SUMMARY OF THE INVENTION

To address the above-discussed deficiencies of the prior art, the present invention provides a circuit for, and method of, reducing a preload current required to maintain a duty cycle of an asymmetrical DC/DC converter and a DC/DC converter incorporating the circuit or the method. In one embodiment, the circuit includes an auxiliary inductor, coupled in series with an output capacitor of the converter in an output current doubler thereof, that reduces ripple current in the output current doubler and thereby maintains the duty cycle. For purposes of the present invention, maintaining the duty cycle includes allowing the duty cycle to moderate or change its operating value, often by a small amount.

The present invention therefore introduces the broad concept of employing an auxiliary inductor coupled between the main inductors of an output current doubler to compensate, at least partially, for any current difference that may occur between the main inductors and reduce any resulting ripple current that may develop within the output current doubler.

In one embodiment of the present invention, the converter comprises first and second complementarily-driven power switches. In an embodiment to be illustrated and described, only two power switches are employed. Of course, the present invention may be employed with converters having more than two power switches.

In one embodiment of the present invention, the converter comprises first and second power switches that operate in a zero-voltage switching (ZVS) mode. Although not necessary to the present invention, operating the switches in a ZVS mode decreases power dissipation and stress in the switches and thereby increases the converter's overall efficiency.

In one embodiment of the present invention, the output current doubler comprises first and second main inductors having inductances based on the duty cycle. In an embodiment to be illustrated and described, the duty cycle is complementary (D, 1−D), so the inductances of the main inductors are related to each other as D, 1−D.

In one embodiment of the present invention, the output current doubler comprises an output capacitor having an electrode coupled to the common node and the common node is grounded. The output of the converter is derived across the output capacitor. Of course, the common node can be attached to another point or can float, as necessary.

In one embodiment of the present invention, the auxiliary inductor does not saturate when reducing the load current in the output current doubler. Since the inductance of the auxiliary inductor is comparable to or even larger than the inductance of the first and second main inductors, the ripple current between the first and second main inductors is small. Large load currents in the output of the converter tend to saturate the auxiliary inductor, thereby effectively removing the auxiliary inductor from the circuit.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
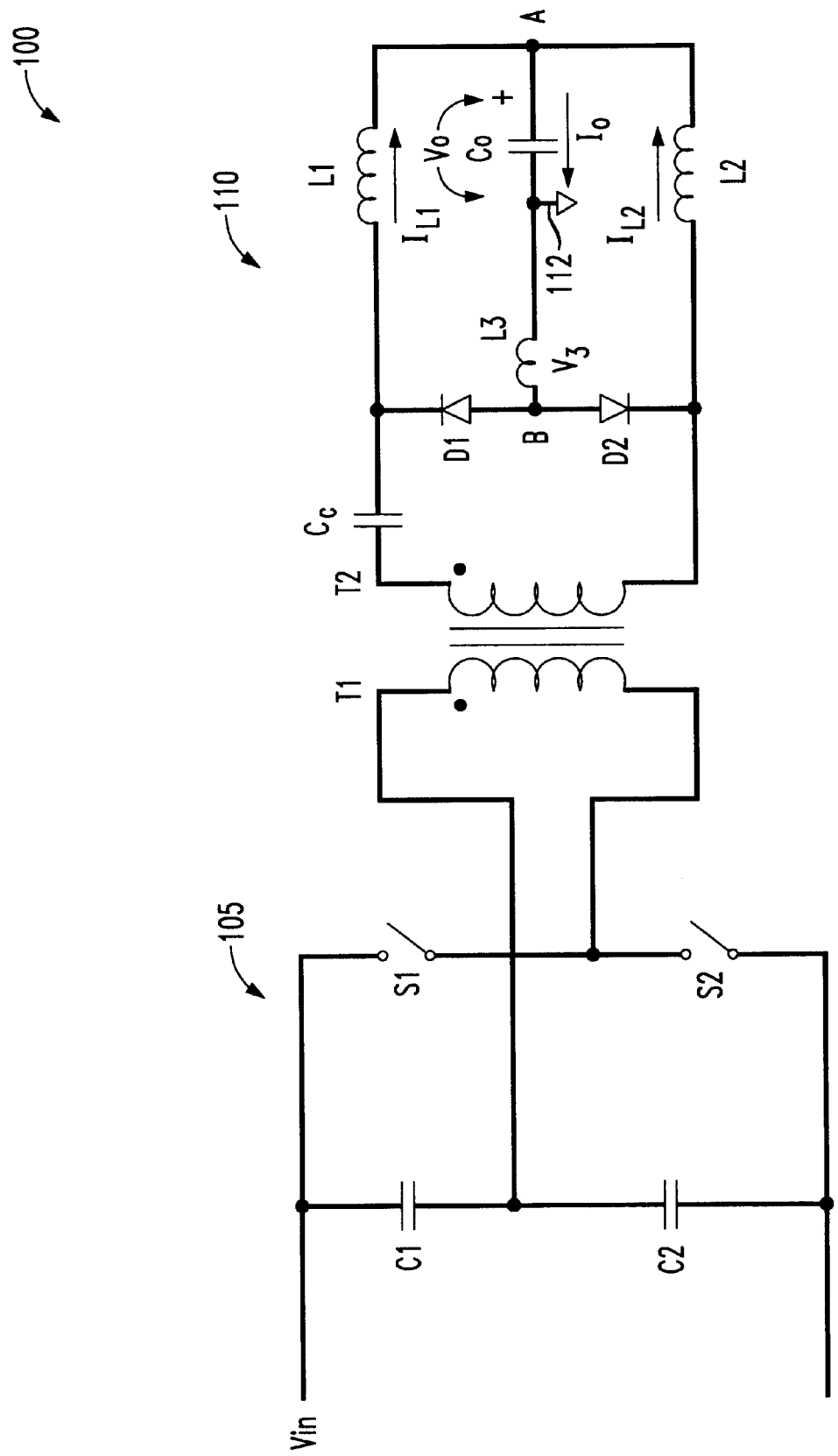
FIG. 1 illustrates a schematic diagram of an embodiment of a DC/DC converter constructed in accordance with the principles of the present invention.

Referring initially to FIG. 1, illustrated is a schematic diagram of an embodiment of a DC/DC converter 100 constructed in accordance with the principles of the present invention. The DC/DC converter 100 includes an input voltage Vin coupled to an input circuit 105 having first and second capacitors C1, C2 and first and second power switches S1, S2 that are further coupled to a primary transformer winding T1. The DC/DC converter 100 further includes a secondary transformer winding T2 coupled to an outout circuit 110 having a coupling capacitor Cc, first and second diodes D1, D2, first and second main inductors L1, L2, an auxiliary inductor L3 and an output capacitor Co. The output circuit 110 is organized in a current doubler arrangement which, as is illustrated, comprises an output capacitor having an electrode coupled to a grounded common node.

In the illustrated embodiment, the DC/DC converter 100 provides a circuit for and a method of reducing a preload current that would be required to maintain a duty cycle of the DC/DC converter 100 when operating in an asymmetrical mode. The output circuit 110 includes the auxiliary inductor L3, coupled in series with the output capacitor Co between a node A and a node B in the current doubler arrangement of the output circuit 110. The positions of the auxiliary inductor L3 and the output capacitor Co may be interchanged in the output circuit 110, if required. The auxiliary inductor L3 reduces ripple current in the output current doubler circuit and thereby maintains the duty cycle of the DC/DC converter 100. The broad concept, introduced in the present invention, therefore employs the auxiliary inductor L3 coupled between first and second main inductors L1, L2 to at least partially compensate for any current difference that may occur between first and second main inductors L1, L2.

In the illustrated embodiment, the first and second power switches S1, S2 are complementarily-driven. That is, the switching cycle may be divided into a primary interval D (during which only the second power switch S2 is conducting) and an auxiliary interval 1−D (during which only the first power switch S1 is conducting). Additionally, first and second power switches S1, S2 operate in a zero-voltage switching (ZVS) mode. Operating these switches in a ZVS mode decreases power dissipation and stress in the switches and thereby increases the overall efficiency of the converter. Whereas only two power switches are employed in the illustrated embodiment, the present invention may be employed with converters having more than two power switches.

A load current Io is the sum of a first main inductor current IL1 and a second main inductor current IL2. The ripple in the load current Io is also the sum of the ripple in each of the first and second main inductor currents IL1, IL2. To obtain a ripple-free load current Io where first and second main inductors L1, L2 have inductance values $L2i$, $L2i$ respectively, the condition $L1i/L2i=(1-D)/D$ must be achieved. For this condition, the load current Io would remain ripple-free for a load current of zero since the first main inductor current IL1 and the second main inductor current IL2 would be equal in value and opposite in sense. Practically, first and second main inductors L1, L2 may have inductance values that vary as much as 20%.

Without the auxiliary inductor L3, this difference in inductance values would produce a difference between the ripple current of the first main inductor current IL1 and the ripple current of the second main inductor current IL2 causing the output capacitor Co to begin charging under light load conditions. An output voltage control loop would reduce the primary interval D to a small or zero value to correct this condition. An operating mode having this very small duty cycle negatively impacts performance through higher losses and slower dynamic response. To avoid this, a large preload would be applied across the output capacitor Co resulting in a lower converter efficiency and an increased thermal design burden.

Use of the auxiliary inductor L3, in the illustrated embodiment, greatly reduces the preload value required to achieve lightly loaded converter operation. The auxiliary inductor L3 is effectively added in series with the output and is designed to saturate at a value of the output current Io that is slightly higher than the maximum lightly loaded condition desired. Although an unsaturated auxiliary inductor L3 may have an inductance value comparable to first and second main inductors L1, L2, it is designed to saturate at a much lower current value than first and second main inductors L1, L2. This attribute allows the auxiliary inductor L3 to be much smaller physically and still perform its function.

When the DC/DC converter 100 is operating at or near a no load condition, the output current Io due to a mismatch in inductances between first and second main inductors L1, L2 is small. Since the inductance of the auxiliary inductor L3 is fairly large under this condition, any difference in the currents between first and second main inductors L1, L2 will induce a voltage V3 across the auxiliary inductor L3. The voltage V3 is significant enough in value and has a polarity to reduce much of any difference in the currents between first and second main inductors L1, L2. The auxiliary inductor L3 of the illustrated embodiment has been demonstrated to reduce needed preload values down to about 20% of a conventional converter, for one case studied, employing an output current doubler structure.

Figure 2:
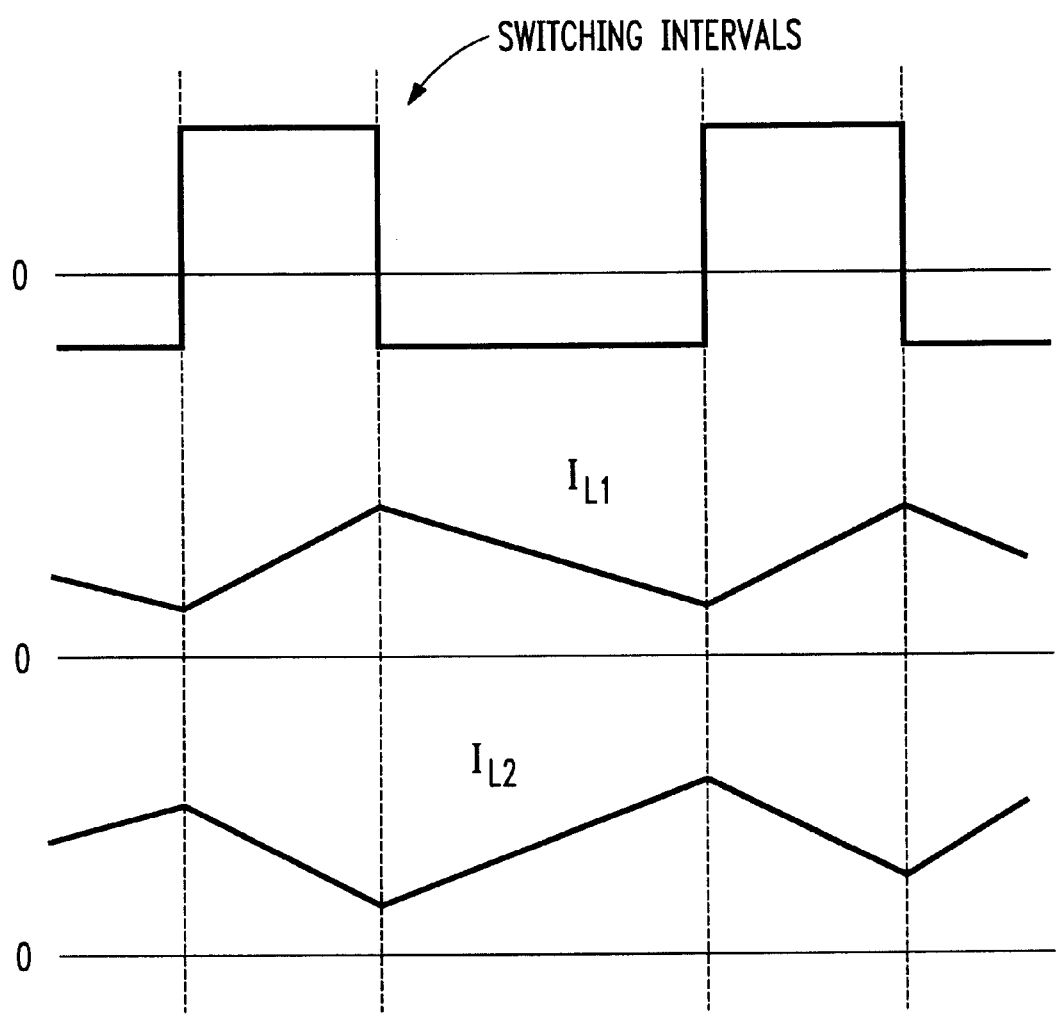
FIG. 2 illustrates key waveforms associated with the DC/DC converter of FIG. 1.

Turning now to FIG. 2, illustrated are key waveforms 200 associated with the DC/DC converter 100 of FIG. 1. The key waveforms 200 show first and second main inductor currents IL1, IL2 displayed with the primary and auxiliary intervals D, 1–D. When the transformed input voltage Vin is applied to the first main inductor L1 having the inductance L1$i$, the first main inductor current IL1, increases with a slope of [Vin–Vo]/L1$i$ for a transformer turns ratio of unity. During this interval, the second main inductor current IL2 (for the second main inductor L2 having the inductance L2$i$) decreases with a slope of Vo/L2$i$. During the next interval, these slopes reverse as shown. Use of the auxiliary inductor L3 in the DC/DC converter 100 provides an equilibrating or compensating effect on inductor current imbalances under light load conditions without affecting converter operation for more substantial loads.

Although the present invention has been described in detail, those skilled in the art should understand that they can make various changes, substitutions and alterations herein without departing from the spirit and scope of the invention in its broadest form.

What is claimed is:

1. A circuit for reducing a preload current required to maintain a duty cycle of an asymmetrical DC/DC converter, comprising:

an auxiliary inductor, coupled in series with an output capacitor of said converter in an output current doubler thereof, said output current doubler having first and second main inductors, said auxiliary inductor reducing ripple current in said output current doubler and thereby maintaining said duty cycle.

2. The circuit as recited in claim 1 wherein said converter comprises first and second complementarily-driven power switches.

3. The circuit as recited in claim 1 wherein said converter comprises first and second power switches that operate in a zero-voltage switching mode.

4. The circuit as recited in claim 1 wherein inductances of said first and second main inductors are based on said duty cycle.

5. The circuit as recited in claim 1 wherein said output current doubler comprises an output capacitor having an electrode coupled to a common node.

6. The circuit as recited in claim 1 wherein said common node is grounded.

7. The circuit as recited in claim 1 wherein an unsaturated said auxiliary inductor reduces said ripple current in said output current doubler.

8. A method of reducing a preload current required to maintain a duty cycle of an asymmetrical DC/DC converter, comprising:

reducing ripple current in an output current doubler, having first and second main inductors, with an auxiliary inductor coupled in series with an output capacitor of said converter; and maintaining said duty cycle.

9. The method as recited in claim 8 wherein said converter comprises first and second complementarily-driven power switches.

10. The method as recited in claim 8 wherein said converter comprises first and second power switches that operate in a zero-voltage switching mode.

11. The method as recited in claim 8 wherein inductances of said first and second main inductors are based on said duty cycle.

12. The method as recited in claim 8 wherein said output current doubler comprises an output capacitor having an electrode coupled to a common node.

13. The method as recited in claim 12 wherein said common node is grounded.

14. The method as recited in claim 8 wherein an unsaturated said auxiliary inductor reduces said ripple current in said output current doubler.

15. An asymmetrical DC/DC converter, comprising:

first and second power switches;

an isolation transformer having a primary winding coupled to said first and second power switches;

an output current doubler, having first and second main inductors coupled to a secondary winding of said isolation transformer; and an auxiliary inductor, coupled in series with an output capacitor of said converter in said output current doubler, that reduces ripple current in said output current doubler and thereby maintains said duty cycle.

16. The DC/DC converter as recited in claim 15 wherein said first and second power switches are complementarily driven.

17. The DC/DC converter as recited in claim 15 wherein said first and second power switches operate in a zero-voltage switching mode.

18. The DC/DC converter as recited in claim 15 wherein inductances of said first and second main inductors are based on said duty cycle.

19. The DC/DC converter as recited in claim 15 wherein said output current doubler comprises an output capacitor having an electrode coupled to a common node.

20. The DC/DC converter as recited in claim 19 wherein said common node is grounded.

21. The DC/DC converter as recited in claim 15 wherein an unsaturated said auxiliary inductor reduces said ripple current in said output current doubler.

* * * * *